United States Patent [19]

Whittam

[11] 4,275,047

[45] Jun. 23, 1981

[54] ZEOLITE SYNTHESIS

[75] Inventor: Thomas V. Whittam, Stockton on Tees, England

[73] Assignee: Imperial Chemical Industries Limited, London, England

[21] Appl. No.: 817,674

[22] Filed: Jul. 21, 1977

[30] Foreign Application Priority Data

Jul. 22, 1976 [GB] United Kingdom ............... 30613/76

[51] Int. Cl.$^3$ ............................................. C01B 33/28
[52] U.S. Cl. ................................. 423/329; 260/448 C; 423/328
[58] Field of Search ............... 423/329, 328, 330, 118; 260/448 C; 252/455 Z

[56] References Cited

U.S. PATENT DOCUMENTS

| | | | |
|---|---|---|---|
| 3,321,272 | 5/1967 | Kerr | 423/329 |
| 3,692,475 | 9/1972 | Johnson | 423/329 |
| 3,702,886 | 11/1972 | Argauer et al. | 423/328 |
| 3,849,463 | 11/1974 | Dwyer et al. | 423/328 |
| 3,947,482 | 3/1976 | Albers et al. | 423/329 X |
| 3,966,883 | 6/1976 | Vaughan et al. | 423/329 |
| 4,166,099 | 8/1979 | McDaniel et al. | 423/329 |
| 4,175,114 | 11/1979 | Plank et al. | 423/329 |

OTHER PUBLICATIONS

Zhdanov, "Molecular Sieve Zeolites-I" ACS, 1971, pp. 36 & 37.

*Primary Examiner*—Edward J. Meros
*Attorney, Agent, or Firm*—Cushman, Darby & Cushman

[57] ABSTRACT

Whereas previously zeolites of the ZSM-5 family have been synthesized in reaction mixtures in which the presence of alkylammonium ions was considered to be essential, the use of such ions can be avoided if the mixture contains a seed zeolite having a port diameter in the range 5.8 to 7.0. The seed zeolite need not be a member of the ZSM-5 family but can be, for example zeolite nu-1 which has a distinctly different structure. The reaction mixture preferably is limited in alkalinity and preferably contains strong acid anions.

6 Claims, No Drawings

ZEOLITE SYNTHESIS

This invention relates to a method of zeolite synthesis especially suitable for making zeolites of the ZSM-5 family.

The ZSM-5 family of zeolites includes those known as ZSM-5, ZSM-8, ZSM-11 and ZSM-12. A general description of the family is available in U.S. Pat. No. 3,775,501 and the above members are more particularly described in the following specifications:

ZSM-5: U.S. Pat. No. 3,702,886 and U.K. Pat. No. 1,161,974
ZSM-8: U.K. Pat. No. 1,334,243
ZSM-11: U.S Pat. No. 3,709,979
ZSM-12: U.K. Pat. No. 1,365,317

Other members of the ZSM-5 family include zeta-1, described in published Netherlands application 7512644, and zeta-3, described in published Netherlands application 7512645.

Typically the ZSM-5 family of zeolites can be defined by the following characteristics:

$SiO_2/Al_2O_3$: 5 to 100
port diameter: 6 to 6.5 A (corresponding to rings of 10 $SiO_4$ and $AlO_4$ tetrahedra)

in addition to their characteristic X-ray diffraction patterns, which are set out in the above-noted references.

These zeolites, which are useful as catalysts for a variety of reactions involving hydrocarbons, especially the formation or interconversion of aromatic hydrocarbons, have usually been made by reaction of a synthesis mixture containing a quaternary ammonium compound, especially a tetrapropylammonium compound, which is expensive and not readily recoverable from the product. (Quaternary ammonium compounds and quaternary phosphonium compounds are hereinafter referred to as "onium" compounds).

We have now found that such zeolites can be made without using such onium compounds if the synthesis reaction is carried out in the presence of a seed quantity of a zeolite having about the same port diameter as the one required. This conflicts with the general belief that onium ions are essential as a "template" for the formation of the ZSM-5 structure and is surprising because certain of the zeolites that can be used as seeds have a structure distinctly different from that of the ZSM-5 family. Indeed, in suitable reaction conditions such zeolites seed the formation of ZSM-5 zeolites instead of the formation of zeolites having their own structure.

The provisional specification supporting the present UK application 30613/76 was filed on July 27, 1976 and describes the use as seed of a zeolite of the ZSM-5 family. Since that date it has been found that the said different zeolites are also effective as seeds for the formation of the ZSM-5 family of zeolites. The said provisional specification is incorporated herein by reference.

Seeding as a means of inducing crystallisation is a very old technique. In the art of zeolite manufacture various proposals to use it have been made and include the following:

seeding by zeolite:
U.K. Pat. No. 1,297,256, in making ZSM-4;
U.S. Pat. No. 3,247,194, in making ZK-5;
U.S. Pat. No. 3,733,391, in making faujasite;
U.S. Pat. No. 4,007,253, in making faujasite (note that the seed is not the same as the product);
seeding by other aluminosilicate:
U.K. Pat. No. 1,117,568, in making ZSM-4;
U.K. Pat. No. 1,160,463, in making faujasite;
U.S. Pat. No 3,578,398, in making a zeolite similar to offretite;
U.S. Pat. No. 3,947,482, in making various zeolites;

The last-mentioned U.S. specification discloses a method in which a small batch of onium-containing zeolite synthesis mixture is aged to produce a nucleation of slurry, the slurry is added to a larger batch of synthesis slurry containing no onium compound and the whole mixture is maintained in zeolite-crystallising conditions. Although this specification discloses broadly that the method can be used in making inter alia ZSM-5, ZSM-8 and ZSM-11, it describes specifically only the preparation of offretite of ZK-4, which have ring sizes respectively greater and smaller than those of the ZSM-5 family, and does not show how to make a ZSM-5 type zeolite.

According to the invention a method of making a zeolite of the ZSM-5 family comprises reacting an alkaline mixture comprising an alumina source, a silica source and alkali metal ions in the presence of a seed quantity of a zeolite having a port diameter in the range 5.8 to 7.0 Angstrom units until the required zeolite has been formed and recovering the product zeolite.

The zeolites that can be used as seeds include any of the zeolites mentioned above as members of the ZSM-5 family and also others having pore diameters in the stated range, in particular the zeolite nu-1 described in our co-pending U.K. application No. 60431/75-4957-31641/76, co-pending U.S. application Ser. No. 727,773 filed Sept. 29, 1976, now U.S. Pat. No. 4,060,590 and published Netherlands application No. 7610766, and zeolite FU-1 described in our co-pending U.K. application No. 46130/76 filed on Nov. 5, 1976 and copending U.S. application Ser. No. 845,391, filed Oct. 25, 1977, now U.S. Pat. No. 4,209,498. The data characterising these zeolites are incorporated herein by reference from these specifications. Other examples of zeolites having port diameters in the appropriate range are brewsterite, clinoptilolite, dachiardite, epistilbite, ferrierite, heulandite and stilbite, and also ZSM-21, ZSM-35 and ZSM-38.

The port diameter of the zeolites to be used as seed is determined by reference to their sorption of molecules of various sizes. Thus they sorb n-hexane freely, para-xylene freely or slowly, but tripropylamine and larger molecules not measurably or extremely slowly. Some of the usable seed zeolites sorb meta-xylene or cyclohexane but others do not and it is therefore concluded that structures affording port diameters slightly over 5.8 but under 7.0 Angstrom units have sufficient in common to provide nuclei for the required zeolite synthesis. The absolute capacity for sorbing the relevant molecules does not appear to be critical. Thus it can be in the range 7–12% w/w for zeolites of the ZSM-5 family or 1–10% w/w for nu-1 or FU-1, when measured at 25° C., 0.5 of saturated vapour pressure.

The port diameter should apparently be a property of the 10-tetrahedra structure, rather than of a partly-blocked 12-tetrahedra structure. A preferred port diameter range is 6.0 to 6.5.

The seed zeolite can be introduced in any convenient form, provided it does not include constituents, such as polyvalent ions, that are capable at the concentration used of interfering with the synthesis reaction. In one form of the invention, useful for starting off a manufacturing campaign, the seed is the immediate solid product of synthesis in the presence of onium compounds according to prior methods, that is, has not been treated to remove onium compounds and their degradation products, whether ionically bound or loosely bound in excess of the stoichiometric proportion. This form of the invention is especially useful also when the seed is not itself a member of the ZSM-5 family. In another form of the invention the seed is a product of the method of the invention and may be termed a "second-generation" seed.

Other forms of the seed zeolite, such as the onium-containing material from which alkali metal ions have been removed by ion exchange, or material from which onium has been removed by chemical treatment such as oxidation, or the ammonium or hydrogen form, can be used if desired. Re-exchange with cations will of course take place in the synthesis mixture, and so will re-hydration if the seed is initially in dehydrated form.

The reaction mixture to be used in the method of the invention suitably has the following molar composition:

$SiO_2/Al_2O_3$ typically: 15 to 200 and preferably 30 to 120

$OH^-/SiO_2$: 0.4 to 0.5 and preferably 0.1 to 0.4

$(H_2O/OH^-)$: 5 to 500 and preferably 10 to 300 and suitably contains 0.01 to 100 g, especially 0.1 to 20 for example 0.1 to 2.0 g, of seed zeolite per 100 g of $SiO_2$. (Note that the $H_2O/(OH)_2^{--}$ ratio given in the provisional specification was by inadvertent error too low by a factor of 10 and thereby inconsistent with the Examples).

The reaction mixture preferably contains one or more anions of strong acids, especially chloride, bromide, iodide or sulphate. A suitable proportion is up to 10 equivalents (for example 10 mols of sodium chloride or 5 mols of sodium sulphate) per mol of silica, that is, $X^-/SiO_2=0-10$; a preferred range is 0.3 to 3.0. Such anions can be introduced as a salt of sodium or potassium or in the form of an acid, aluminium salt, ammonium salt and/or (if one is to be present) onium salt.

Whether an onium compound is present depends on which type of seed is used. If the seed is a member of the ZSM-5 family an appropriate onium compound can be present and thus it is possible to make a product of low alkali content without extensive subsequent ion exchanging and to have an additional means of controlling the crystallite size of the product. If the seed is nu-1 or FU-1 the concentration of onium compound, should preferably, especially if it is a tetramethyl compound, be such that the ratio of onium ions to onium + alkali metal ions is at most 0.4 and especially under 0.05. The proportion of seed added and the onium content of the seed should be chosen so as to meet these stipulations. Such limits are also suitable using ZSM-5 type seed.

If onium compound is present as a result either of having been added as such or as part of the seed or of being formed from a quaternisable amine or phosphine and a quaternising agent such as an alcohol or alkyl halide or sulphate, the groups linked to nitrogen or phosphorus suitably contain 1 to 20 carbon atoms each. Preferably the contain 4 to 20 carbon atoms in all, and more preferred compounds are tetraalkyl or aryltriakyl ammonium compounds in which not more than three of the groups are methyl. Examples of quaternary compounds that can be used are those providing the tetrapropylammonium and trimethylcetyl ammonium ions.

The reaction mixture may, if desired, contain an alcohol having a solubility in water preferably of at least 1%, for example isopropyl alcohol, since this tends to promote the formation of high-silica zeolites, and to decrease the crystallite size of the zeolite product. This feature is the subject of our co-pending application No. 39784/75 (U.S. Ser. No. 727,771).

The alumina source in the reaction mixture is most conveniently sodium aluminate, but can be aluminium salt for example the chloride or sulphate (which will produce a mineralising salt in situ) or alumina itself, which should be a hydrated or hydratable form such as colloidal alumina, pseudoböhmite, böhmite, gamma alumina or the alpha or beta trihydrate. More than one source can be used if desired.

The silica source can be of any type having sufficient chemical reactivity to take part in the zeolite synthesis at an adequate rate. Suitably it is a water-soluble or dissolved silicate such as a waterglass or a sodium metasilicate hydrate, sesquisilicate or disilicate, whether of the so-called "active" type or not. Alternatively it can be a colloidal silica, for example as sold under the trade name "LUDOX", "NALCOAG" or "SYTON" (Registered Trade Marks), which typically contain 20–50% w/w of silica in aqueous suspension. Most conveniently the silica is introduced as a finely-divided powder such as "aerosil", fume silica or precipitated silica, especially in forms suitable for use as reinforcing pigments for rubber or silicone rubber. A very suitable silica is one made by precipitation from an alkali metal silicate solution, for example the type known as "KS300" made by AKZO.

If desired, part of the silica and/or alumina can be added as an aluminosilicate. Usually this ingredient should be an amorphous or low-order aluminosilicate, such as clay, in order to avoid providing nuclei for the formation of a product other than the required zeolite.

The seed zeolite can be added to the mixture at any stage before crystallisation begins but is preferably added before the induction period after which unwanted products such as mordenite or analcite would begin to crystallise.

As a result of the use of seed zeolite the time/or temperature of reaction can be usefully less than when using previously published methods of making zeolites of the ZSM-5 family. Thus, for example, =whereas in making zeolite ZSM-5 by the methods described in the examples of U.S. Pat. No. 3,702,886 the reaction takes 5–8 days at 149°–175° C., reaction times of 16–24 hours at 150° C. are typical for the method of the present invention. Usually the temperature is in the range 80°–250° C. If the synthesis is at superatmospheric pressure, a permanent gas (such as nitrogen) may be present under pressure, especially if ebullition is to be prevented.

After the zeolite synthesis reaction, the product can be subjected to any of the usual steps of washing, drying, calcination and ion-exchange, such as are used in producing useful absorbents and/or catalysts. Suitable steps and uses are described in the specifications referred to above.

In the following Examples the composition of the synthesis mixtures were calculated on the basis of the following data.

|  | Formula | Molecular weight |
|---|---|---|
| Sodium aluminate | 1.25 $Na_2O \cdot Al_2O_3$ | 143.6 per free $Na_2O$ |
|  |  | 179.4 per $Al_2O_3$ |
| Aluminum sulphate | $Al_2(SO_4)_3 \cdot 16H_2O$ | 630.4 per $Al_2O_3$ |
|  |  | 105.1 per $X^-$ |
|  |  | 39.4 per $H_2O$ |
| Silica KS300 | $SiO_2$ 98.9% | 60.06 |
|  | $Na_2O$ 1.1% | 62 |
| Sodium metasilicate pentahydrate | $Na_2SiO_3 \cdot 5H_2O$ | 212.05 per $SiO_2$ or free $Na_2O$ |
|  |  | 42.4 per $H_2O$ |
| Waterglass | $Na_2O \cdot 3.4SiO_2 \cdot 24H_2O$ | 698.2 per free $Na_2O$ |
|  |  | 205.4 per $SiO_2$ |
|  |  | 38.8 per $H_2O$ |
| Sodium hydroxide | NaOH | 80 per free $Na_2O$ |
| Sodium sulphate | $Na_2SO_4$ | 71.03 per $X^-$ |
| Tetramethylammonium hydroxide | $(CH_3)_4NOH$ 25% | 182 |
| TMAOH | $H_2O$ 75% | 18 |
| Sulphuric acid | $H_2SO_4$ 98% | 50 per $X^-$ |
|  | $H_2O$ 2% | 900 per $H_2O$ added |
|  |  | 50 per $H_2O$ (by neutralisation) |

Notes
1 Seed was not counted as an ingredient and is indicated by an asterisk in the Tables below.
2 "Free $Na_2O$" means $Na_2O$ added as hydroxide, aluminate or silicate and is taken as equal to half the number of OH ions.

EXAMPLE 1 and its X-ray diffraction pattern coincided almost exactly with than of zeolite zeta 3.

TABLE 1

| Ingredient |  | Molar contribution |  |  |  |  |  |
|---|---|---|---|---|---|---|---|
|  |  | $Al_2O_3$ | $SiO_2$ | Free $Na_2O$ | $X^-$ | $H_2O$ | Seed |
| Sodium metasilicate pentahydrate | 14.6 g |  | 0.069 | 0.069 |  | 0.34 |  |
| Water A | 300 g |  |  |  |  | 16.7 |  |
| Silica KS300 | 51.43 |  | 0.86 | 0.009 |  |  |  |
|  | 0.57 |  |  |  |  |  |  |
| Zeta 3 seed | 0.1 g | * | * | * | * | * | $2.3 \times 10^{-5}$ |
| Sodium aluminate | 1.78 g | 0.01 |  | 0.012 |  |  |  |
| Water B | 10.3 g |  |  |  |  | 0.57 |  |
| Sodium sulphate | 28.2 g |  |  |  | 0.397 |  |  |
| Water C | 380 g |  |  |  |  | 21.1 |  |
|  | total mols | 0.01 | 0.929 | 0.090 | 0.397 | 38.71 | $2 \times 3 \times 10^{-5}$ |
|  | per $Al_2O_3$ | 1 | 92.9 | 9.0 | 39.7 | 38.71 | $2.3 \times 10^{-5}$ |

The composition of the reaction mixture was as shown in Table 1. The procedure was as follows.

Slurry A was made up at room temperature by dissolving the sodium metasilicate in water A and stirring in the silica and zeta 3 seed. Solution B was made up by dissolving the sodium aluminate in water B. Solution C was made up by dissolving the sodium sulphate in water C. Then solution B was stirred into slurry A and solution C added to the mixture, still at room temperature. The zeta-3 seed had the composition 0.7$Na_2O$.0.3-$Q_2O$.66$SiO_2$.7.5$H_2O$, where Q is tetrapropylammonium.

The mixture was reacted for 24 hours at 150° C. in a 1-liter stirred stainless steel autoclave, then cooled. The solid phase was collected on a filter, washed, dried overnight at 80° C. and examined for chemical composition and by X-ray diffraction. Its composition was

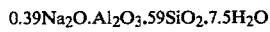

0.39$Na_2O$.$Al_2O_3$.59$SiO_2$.7.5$H_2O$

EXAMPLE 2

The composition of the reaction mixture was as shown in Table 2. The procedure was as follows:

Slurry A was made up at 50° C. by mixing the waterglass with water A, dissolving the sodium hydroxide in the mixture and stirring in the silica and zeta 3 seed. Solution B was made up at 50° C. by dissolving the sodium aluminate in water B, Solution C was made up at 50° C. by dissolving the sodium sulphate in water C. Then solution B was stirred into slurry A, followed by solution C.

The mixture was reacted for 16 hours at 150° C. in a 1-liter stirred stainless steel autoclave, then cooled. The solid phase was collected on a filter, washed, dried overnight at 80° C. and examined for chemical composition and by X-ray diffraction. Its composition was

0.89$Na_2O$.$Al_2O_3$.42.5$SiO_2$.9$H_2O$ and its X-ray diffraction pattern coincided almost exactly with that of the seed zeolite.

TABLE 2

| Ingredient | | Al₂O₃ | SiO₂ | Free Na₂O | X⁻ | H₂O | Seed |
|---|---|---|---|---|---|---|---|
| Waterglass | 5.8 g | | 0.028 | 0.0083 | | 0.15 | |
| Sodium hydroxide | 1.6 g | | | 0.02 | | | |
| Silica KS300 | 26.2 0.3 | | 0.436 | 0.005 | | | |
| Zeta 3 seed from example 1 product | 25 g | * | * | * | | * | 0.0065 |
| Water A | 155 g | | | | | 8.6 | |
| Sodium aluminate | 1.78 g | 0.01 | | 0.012 | | | |
| Water B | 19.8 g | | | | | 1.1 | |
| Sodium sulphate | 142 g | | | | 2.0 | | |
| Water C | 190 g | | | | | 10.6 | |
| | total mols | 0.01 | 0.464 | 0.0453 | 2.0 | 20.45 | 0.0065 |
| | per Al₂O₃ | 1.0 | 46.4 | 4.53 | 200 | 2045 | 0.65 |

EXAMPLE 3

(a) The composition of the reaction mixture was as shown in Table 3. The procedure was as follows:

Slurry A was made up by dissolving the sodium hydroxide in water A at 90° C. and stirring in the zeta-1 seed and the silica. Solution B was made up by dissolving the sodium aluminate in water B, also at 90° C. and then stirred into slurry A, still at 90° C. The zeta-1 seed had the composition $0.3Na_2O.Al_2O_3.25SiO_2$ and had been calcined for 24 hours at 550° C.

The mixture was reacted for 24 hours at 180° C. in a 1-liter stirred stainless steel autoclave, then cooled. The solid phase was collected on a filter, washed, dried overnight at 80° C. and examined for chemical composition and by X-ray diffraction. Its composition was $$0.49Na_2O.Al_2O_3.72SiO_2.7.5H_2O$$

and its X-ray diffraction pattern coincided almost exactly with that of the seed zeolite zeta-1.

(b) Using the same reactants but without the seed zeolite, and following the same procedure, the solid product had the composition $$0.95Na_2O.Al_2O_3.10.5SiO_2.4.9H_2O$$

and the X-ray diffraction pattern of mordenite.

TABLE 3

| Ingredient | | Al₂O₃ | SiO₂ | Free Na₂O | H₂O | Seed |
|---|---|---|---|---|---|---|
| Sodium hydroxide | 4.6 g | | | 0.057 | | |
| Water A | 412.2 g | | | | 22.9 | |
| Zeta 1 | 3 g | * | * | * | * | 1.5 × 10⁻³ |
| Silica KS300 | 62.1 g 0.7 | | 1.03 | 0.012 | | |
| Sodium aluminate | 2.2 g | 0.012 | | 0.015 | | |
| Water B | 12 g | | | | 0.67 | |
| | Total mols | 0.012 | 1.03 | 0.084 | 23.57 | |
| | per Al₂O₃ | 1.0 | 85.8 | 7.0 | 1964 | 0.13 |

EXAMPLE 4

(a) The reaction mixture of Example 3 was reacted by heating at 95° C. for 12 days in a "PYREX" (Registered Trade Mark) flask under reflux and with agitation. The solid phase was isolated in the same manner as before and found to have the composition $$0.7Na_2O.Al_2O_3.66SiO_2.9H_2O$$

and the X-ray diffraction pattern of a substantially pure zeta-1 zeolite.

(b) Run (a) was repeated without the seed zeolite, with a reaction time of 21 days. The product contained about 30% w/w mordenite, mixed with amorphous materials.

EXAMPLE 5

(a) A synthesis mixture having the composition $35.43Na^+.Al_2O_3.60.24SiO_2.6.69OH^-.28.74X^-.1689.6H_2O$ was made up by diluting 314 g of waterglass with 200 g of water, stirring in a solution of 16 g of aluminium sulphate and 28.9 g of sulphuric acid in 408 g of water, and then stirring in 10 g of a sample of zeolite nu-1 of the high d-spacing type in the form of very small crystallites, containing about 2.4 mols of (TMA)₂O per mol of Al₂O₃. The mixture was transferred to a 1 liter stainless steel autoclave and with stirring at 1800 rpm reacted at 180° C. for 24 hours under autogenous pressure, then cooled. The solid was collected on a filter, washed thoroughly with water and dried overnight at 80° C. The dried solid had an X-ray diffraction pattern showing it to be mainly ZSM-5, with a trace of kenyaite.

(b) By way of comparison, run (a) was repeated with the addition of TMAOH solution to the waterglass solution providing 10.8 ions each of Q⁺ and OH⁻ in addition to the other ingredients. The product contained zeolite FU-1 as its major constituent.

EXAMPLE 6

(a) The procedure of Example 5 was repeated with the exception that the seed was zeolite FU-1 containing 2.1 mols of Q₂O per Al₂O₃ instead of zeolite nu-1. The product was identical with that of Example 5. (b) By way of comparison, run (a) was repeated with the addition of TMAOH solution to the waterglass solution providing 10.8 ions each of Q⁺ and OH⁻ in addition to the other ingredients. The rate of stirring was also lower (450 rpm). The product consisted of nu-1 and FU-1 in approximately equal quantities, according to its X-ray diffraction pattern.

I claim:

1. In a method of making a zeolite of the ZSM-5 family consisting of ZSM-5, ZSM-8, ZSM-11, ZSM-12, zeta-1 and zeta-3, said family further characterized as having a SiO₂/Al₂O₃ ratio in the range 5 to 100, a port diameter in the range 6.0 to 6.5 Angstrom units corresponding to rings of 10SiO$_4$ and AlO$_4$ and a characteristic X-ray diffraction pattern, by reacting an alkaline mixture comprising an alumina source, a silica source and alkali metal ions until the required zeolite has been formed, the improvement which comprises reacting said mixture in the presence of a seed quantity of a crystallized zeolite having a port diameter in the range 5.8 to 7.0 Angstrom units wherein the concentration of onium compound be such that the ratio of onium ions to (onium+alkali metal) ions is under 0.05 said crystallized zeolite being nu-1 or FU-1.

2. A method according to claim 1 in which the mixture has the molar composition

SiO$_2$/Al$_2$O$_3$: 30 to 120
OH/SiO$_2$: 0.1 to 0.4
H$_2$O/OH$^-$: 10 to 300

3. A method according to claim 1 in which the mixture contains 0.1 to 2.0 g of seed zeolite per 100 g of SiO$_2$.

4. A method according to claim 1 in which the mixture contains one or more anions of strong acids in a proportion of up to 10 equivalents per mole of silica.

5. A method according to claim 4 in which the proportion is in the range 0.3 to 3.0.

6. A method according to claim 4 wherein said ions are selected from the group consisting of chloride, bromide, iodide and sulphate.

* * * * *